United States Patent
Cado et al.

(10) Patent No.: US 6,891,673 B2
(45) Date of Patent: May 10, 2005

(54) THIN FILM POLARIZATION SPLITTER, ITS MANUFACTURE AND OPHTHALMIC LENS WITH PROJECTION INSERTS CONTAINING IT

(75) Inventors: Herve Cado, Champigny sur Marne (FR); Frederic Arrouy, Verlaines (FR); Yvon Helmstetter, Boviolles (FR)

(73) Assignee: Essilor International (FR)

( * ) Notice: Subject to any disclaimer, the term of this patent is extended or adjusted under 35 U.S.C. 154(b) by 32 days.

(21) Appl. No.: 10/409,877

(22) Filed: Apr. 9, 2003

(65) Prior Publication Data

US 2003/0223114 A1 Dec. 4, 2003

(30) Foreign Application Priority Data

Apr. 16, 2002 (FR) .............................. 02 04727

(51) Int. Cl.⁷ ................................. G02B 5/30
(52) U.S. Cl. ................ 359/487; 359/483; 359/485; 359/488; 359/494; 359/495; 359/500; 359/900

(58) Field of Search ................. 359/483, 485, 359/487, 488, 494, 495, 500, 900, 359, 588, 352, 584; 313/479, 461, 473, 474, 477; 351/200, 205, 215

(56) References Cited

U.S. PATENT DOCUMENTS

| | | | |
|---|---|---|---|
| 4,689,387 A | 8/1987 | Kajimoto et al. | 528/76 |
| 4,723,315 A | 2/1988 | Wetherell | 455/619 |
| 4,775,733 A | 10/1988 | Kanemura et al. | 528/67 |
| 5,400,179 A * | 3/1995 | Ito | 359/588 |
| 5,984,477 A | 11/1999 | Weissman et al. | 353/28 |
| 6,075,651 A | 6/2000 | Hoppe | 359/641 |
| 6,313,577 B1 * | 11/2001 | Kunisada et al. | 313/479 |
| 6,394,603 B2 * | 5/2002 | Miwa et al. | 351/215 |
| 2002/0155222 A1 * | 10/2002 | Caron | 427/299 |

* cited by examiner

Primary Examiner—Audrey Chang
Assistant Examiner—Craig Curtis
(74) Attorney, Agent, or Firm—Fish & Richardson P.C.

(57) ABSTRACT

This invention features a thin film polarization splitter, its manufacture and ophthalmic lens with projection inserts containing it.

23 Claims, 2 Drawing Sheets

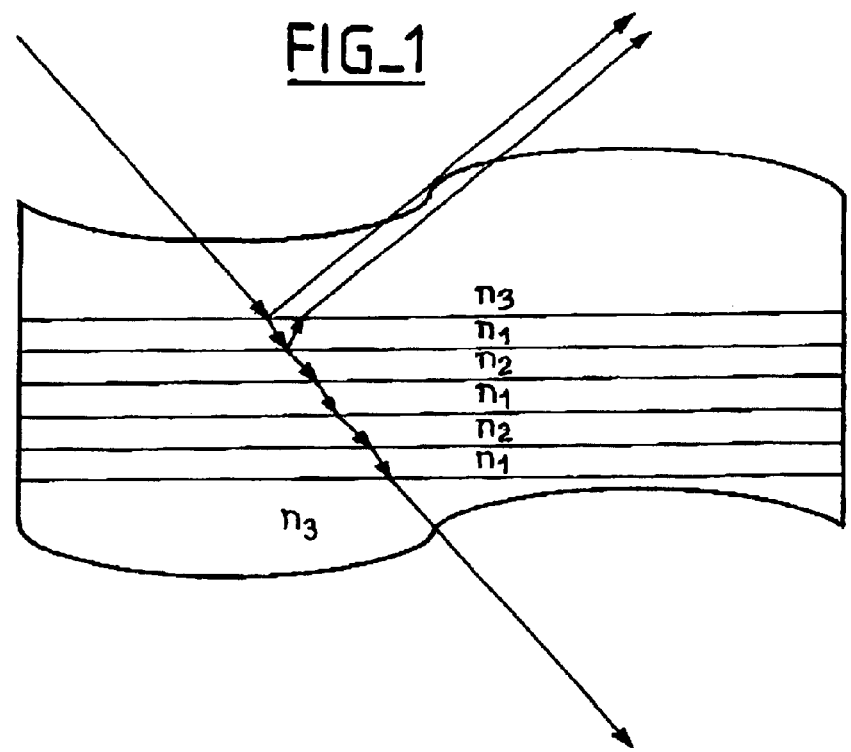
FIG_1
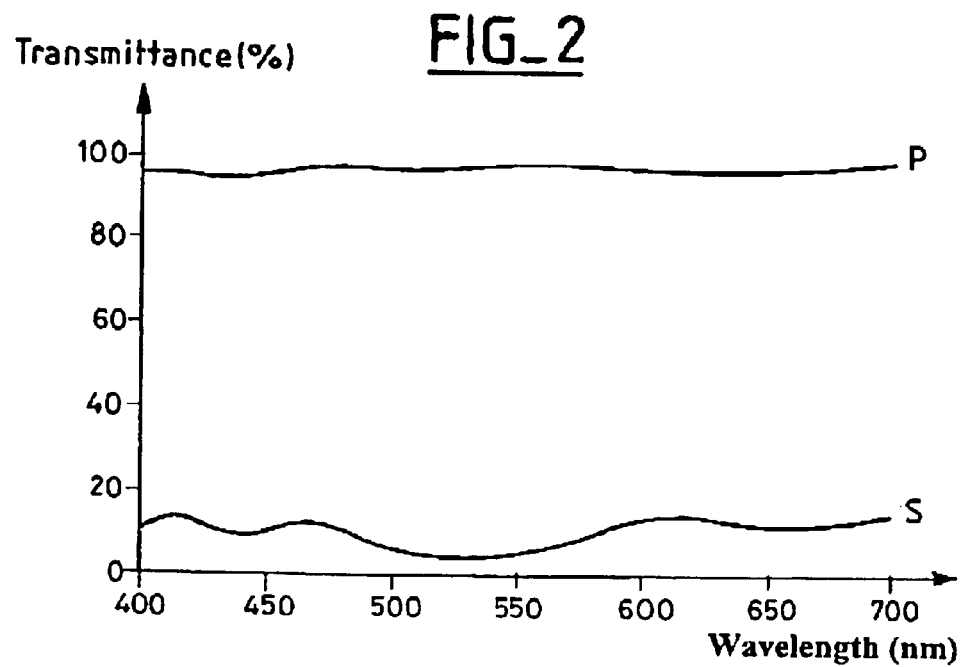
FIG_2

FIG_3
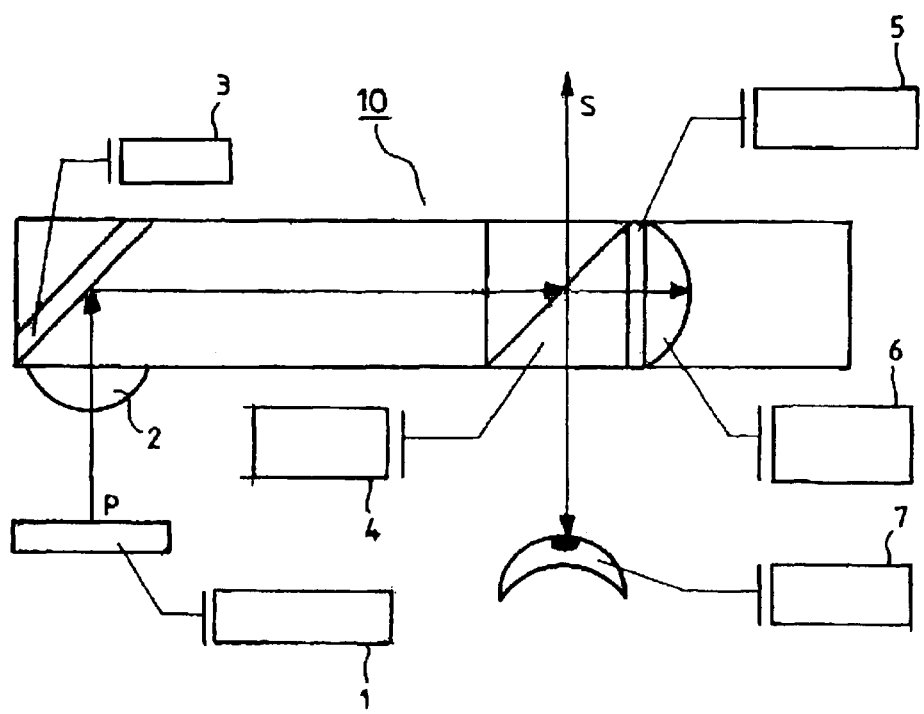

THIN FILM POLARIZATION SPLITTER, ITS MANUFACTURE AND OPHTHALMIC LENS WITH PROJECTION INSERTS CONTAINING IT

CLAIM OF PRIORITY

This application claims priority under 35 USC §119 to French Patent Application Ser. No. 02 04 727, filed on Apr. 16, 2002, the entire contents of which are hereby incorporated by reference.

BACKGROUND

The invention relates to a polarization splitter. It also relates to a method for producing such a polarization splitter. It also relates to ophthalmic lenses having inserts for projecting an image towards the user, that include such a polarization splitter. The invention finally relates to devices for projecting an image towards a user, comprising such ophthalmic lenses.

Polarization splitters are optical components for splitting light into its various polarization components. The direction of light polarization is defined with respect to an oscillatory plane of the electric field. Most frequently, unpolarized light is split into two orthogonal linear polarizations. Here, we distinguish S (perpendicular) polarization and P (parallel) polarization. In S-polarized light, the plane of oscillation is perpendicular to the plane of incidence defined by the surface normal and incidence vector. In P-polarized light, the plane of oscillation is parallel to the plane of incidence. The components can be separated by absorption or by reflection.

Polarization splitting by reflection is based on the principle of total transmission of S-polarized light. We know that a ray striking an optical component at the Brewster angle is split into a polarized totally reflected ray and a partially polarized refracted ray of orthogonal polarization. The reflected and transmitted rays are at right angles to each other.

The Brewster angle depends on the refractive index of the two media making up the optical component. As refractive index varies with wavelength, the Brewster angle also depends on the wavelength of the light. Last, the angle of incidence for a ray can only correspond to the Brewster angle for one particular wavelength. Consequently, such a polarizer is only fully effective for one given wavelength and is not suitable for polarization splitting in a suitable manner over the whole spectrum, notably the visible spectrum.

The polarization splitter disclosed in U.S. Pat. No. 5,400,179 has a splitting ratio that is substantially constant over wavelengths greater than 720 nm, in other words in the near infrared. It is made up by a stack of layers of materials including praseodymium oxide $Pr_6O_{11}$, with a refractive index in three different ranges.

Also, stacks of thin films of materials having different refractive indices on a substrate forming anti-reflective coatings are known.

U.S. Pat. No. 6,313,577 discloses an anti-reflective coating carrying layers of praseodymium titanate. However, such a stack is not suitable for polarization splitting as the number of layers and their thicknesses are not adapted for this purpose. The anti-reflective treatment is optimized for normal incidence, contrary to reflective polarization separation treatment, which only operates for oblique angles of incidence.

The known types of splitter have however proved to be unsuitable for applications such as ophthalmic lenses having inserts for projecting an image towards the user.

By the term ophthalmic lenses we here mean systems for combining images for spectacles or head-mounted devices; an image is projected towards the wearer's eye by an optical path provided in the lens; here, the term "lens" means the optical system containing inserts notably designed to be mounted in a spectacle frame or a head-mounted device. The inserts can comprise mirrors, semi-reflecting plates, polarization splitting cubes, quarter wave plates, lenses, mirrors, concave reflecting lenses (a Mangin mirror for example), diffracting lenses and/or holographic components. A device for projecting images towards the user then comprises the lens mounted in spectacles or a head-mounted device and an image source such as a liquid crystal display, more particularly a micro-display.

In such applications, the polarization splitting elements process the polarized light delivered by the display elements currently employed in such micro-displays. The effectiveness of the polarization splitter will determine contrast and loss of image intensity and, consequently, the brightness of the image, thereby constituting a primordial factor.

The choice of certain polymers as the substrate for the ophthalmic lens constitutes one additional constraint on the specifications. Indeed, certain polymers must undergo thermal treatment at temperatures greater than 100° C. After this type of treatment, the appearance of cracking or crazing is frequently noticed at the stack interfaces.

SUMMARY

This invention provides a polarization splitter which overcomes the disadvantages of the above prior art and, notably, which withstands temperatures between 100 and 150° C.

The invention is based in particular on the discovery that the use of praseodymium titanate makes it possible to obtain polarization spitters having enhanced temperature withstand abilities.

The invention consequently provides a polarization splitter comprising a substrate provided with an alternating stack of layers of $PrTiO_3$ and a material having a lower refractive index, the thickness of these layers e1 and e2 respectively satisfying the relations:

$$e_1 = \frac{\lambda\sqrt{n_1^2 + n_2^2}}{4n_1^2} \qquad e_2 = \frac{\lambda\sqrt{n_1^2 + n_2^2}}{4n_2^2}$$

in which $\lambda$ is the wavelength considered, n1 is the refractive index of the first layer and n2 is the refractive index of the second layer respectively.

According to one embodiment, the substrate is organic.

According to one embodiment, the organic substrate is a polythiourethane.

The second material can be silicon dioxide.

In one embodiment, the splitter respectively carries at least six layers of praseodymium titanate and of second material.

The splitter can be in the form of a cube formed from two prisms one of which is coated with layers of $PrTiO_3$ and material of lower refractive index.

A method for producing a polarization splitter is provided, comprising:

(i) providing a substrate;

(ii) depositing a layer of praseodymium titanate of a thickness $e_1$ such as defined above;

(iii) depositing a layer of a second material of lower refractive index $e_2$ such as defined above; and (iv) repeating steps (i) and (iii) at least once.

Step (iv) preferably comprises at least five repetitions of steps (ii) and (iii).

The substrate is preferably maintained at a temperature greater than ambient temperature during steps (ii) to (iv), The substrate is preferably maintained at a temperature comprised between 80 and 120° C. during steps (ii) to (iv).

In one embodiment, the substrate is subject to ionic cleaning prior to step (ii).

The ionic cleaning is preferably performed under argon.

The rate of evaporation during steps (ii) and (iii) is preferably from 1 to 10 nm/s, particularly preferably 2 to 5 nm/s.

An ophthalmic lens having inserts for projecting an image towards a user comprising the above polarization splitter is also provided.

The polarization splitter can be in the form of a cube.

A device for projecting an image towards a user comprising the above lens is also provided. This projection device can further comprise a liquid crystal micro-display.

DESCRIPTION OF DRAWINGS

The invention is described in detail below with reference to the attached drawings.

FIG. 1 is a diagrammatic view of a polarization splitter according to an embodiment of the invention.

FIG. 2 shows transmittance of respective P- and S-polarized light as a function of wavelength for a polarization splitter according to example 1.

FIG. 3 is a diagrammatic view of an ophthalmic lens having inserts for projecting an image towards the user according to an embodiment of the invention.

DETAILED DESCRIPTION

One embodiment of a polarization splitter according to the invention is shown diagrammatically in FIG. 1.

This splitter comprises, on a substrate of refractive index $n_3$, a stack of alternating layers of two materials of refractive index $n_1$ and $n_2$ respectively. The material of refractive index n, can be the material of high refractive index, i.e. $PrTiO_3$, or the material of low refractive index; indeed, the polarization splitter operates just as well in both cases. For each wavelength λ there is a corresponding pair of layers of thicknesses e1 and e2 the constituents of which, respectively of refractive index n1 and n2, are calculated as follows:

$$e_1 = \frac{\lambda\sqrt{n_1^2 + n_2^2}}{4n_1^2} \qquad e_2 = \frac{\lambda\sqrt{n_1^2 + n_2^2}}{4n_2^2}$$

In order to be effective over a wide range of wavelengths, the spectrum is divided into various wavelengths λ.

The $PrTiO_3$ is employed as the high refractive index material. Preferably, the material is deposited on a substrate starting from a non-stoechiometric composition (available from Merck under the name Substance H2) which is vacuum deposited in the presence of oxygen. The composition is consequently in oxidized form, forming a transparent film of formula $PrTiO_3$.

The refractive index of $PrTiO_3$ is 2.00095 at 635 nm (reference wavelength). The second material consequently has a refractive index which is lower. Among these materials, we can notably mention $SiO_2$ and $MgF_2$, $SiO_2$, the refractive index of which is 1.4786 at 635 nm having proved to be particularly suitable.

The substrate can be any transparent substrate that is compatible with $PrTiO_3$, and the lower refractive index material and, notably, the substrate can be inorganic or organic, organic substrates being however preferred, it being understood that its refractive index $n_3$ is comprised between the values of $n_1$ and $n_2$.

The term "inorganic substrate" here means an inorganic glass substrate in contrast to organic substrates formed from a polymer. Organic substrates raise particular problems, firstly, in view of their poor temperature performance and, secondly, in view of poor thin-film adherence to the substrate.

Organic substrates additionally have a coefficient of thermal expansion which is higher than that of inorganic substrates. For example, while the typical thermal expansion of an inorganic substrate is of the order of $7 \cdot 10^{-6}$ °$C.^{-1}$, that of polycarbonate is $70 \cdot 10^{-6}$ °$C.^{-1}$ and that of MR8 (defined below) is $75 \cdot 10^{-6}$ °$C.^{-1}$, i.e. 10 times higher.

It is possible that this considerable thermal expansion is the reason why crazing is so frequently seen on the surface of multi-layer-type polarization splitters on an organic substrate. Such crazing is particularly bothersome in applications to vision.

Materials suitable as organic substrates are for example polymers of the class of polythiourethanes, obtained from polythiol and a polyisocyanate. Such materials and methods for obtaining them are for example described in U.S. Pat. Nos. 4,689,387 and 4,775,733.

Suitable polythiols are for example pentaerythrol tetrakis (thioglycolate), pentaerythrol tetrakis (mercaptopropionate) or MDO [4-mercaptomethyl-3.6-dithia-1.8-octanedithiol]. The polyisocyanate can notably be xylylene diisocyanate.

A particularly suitable organic substrate is obtained by polymerization of compositions based on xylylene diisocyanate, pentaerythritol tetrakis (mercaptoproprionate) and MDO. Such a product is available from Mitsui under the name MR8.

As the organic substrate one can for example use 1.6 material from Corning Glass, Code 60043, the optical constants of which are substantially identical to those of MR8.

An ideal polarization splitter reflects all the light polarized perpendicularly to the plane of incidence (S) while transmitting all of the light polarized parallel to the plane of incidence (P). In reality, due to the effects of imperfections, absorption etc, the effectiveness of a splitter is well below this. The effectiveness of a polarizer can be expressed as the product of reflection of polarization S (Rs) and transmission of the polarization P (Tp), in other words (Rs)×(Tp). One consequently looks for a polarizer having an effectiveness better than 80% and preferably, better than 90%. The lower limit for the number of layers in the stack is given by the desired regularity of transmittance for the complete light spectrum. In most applications, this spectrum is that of visible light, in other words wavelengths comprised between 400 and 700 nm. In effect, the more layers the splitter has and the more the selectivity of the polarizer for a given wavelength is improved, the greater the spectrum over which polarization splitting occurs is widened.

The upper limit for the number of layers is given by the cost of depositing them. Additionally, starting at a certain point, absorption may reduce efficiency for polarized light. Keeping these principles in mind, an effective polarization splitter preferably comprises a stack comprising 5 to 20, in particular 10 to 15, layers of materials of differing refractive indices.

The optical angle of incidence A for the polarization splitter is such that:

$$\sin A = \frac{n_1 \cdot n_2}{n_3 \cdot \sqrt{n_1^2 + n_2^2}}$$

It can be seen from this relation that the refractive index of the substrate $n_3$ and the desired angle of incidence play a part in the choice of materials for the thin films of the stack.

The polarization splitter of the present invention is particularly suited to applications of the portable vision apparatus type such as ophthalmic lenses incorporating inserts for projecting an image towards the wearer.

One example of such a lens is shown in FIG. 3. The image is supplied by a source 1. Source 1 can be a miniaturized display such as a micro liquid crystal display emitting polarized light. The optical system of the ophthalmic projection lens 10 comprises a field lens 2. A mirror 3 and polarization splitter 4 are placed in the optical path followed by the image inside ophthalmic lens 10. A quarter wave plate 5 and a Mangin mirror are bonded to polarization splitter 4.

Ophthalmic lens 10 operates as follows. Polarized light from source 1 passes firstly through field lens 2. Next, the light is reflected by a mirror 3 which redirects it at an angle of 90°. The light then passes through polarization splitter 4, one of the linear polarization components (S) being reflected and the other (P) being transmitted. The transmitted component passes through a quarter wave plate 5 the axes of which are at 45° to the direction of propagation, in the plane perpendicular to the direction of propagation, after which it strikes a Mangin mirror 6 which reflects the light in order to then pass once again through the quarter wave plate. The light, now S-polarized, is reflected by the polarization splitter towards the observer's eye.

The embodiment of FIG. 3 now allows polarized light emitted by the display to be redirected towards the eye 7 with minimal loss and consequently, maximum intensity.

Preferably, the ophthalmic lens is made from the same material as the substrate on which the stack of thin films has been deposited, consequently, for example, a polythiourethane such as MR8. In this case, the splitter can be constituted by a prism. Indeed, by using for the splitter a substrate of the same composition, and thus of the same refractive index as a material constituting the ophthalmic lens, the polarization splitter can be made less visible to the wearer, thereby reducing the discomfort occasioned by the optical function of the glass. For this type of application, when refractive index $n_3$ is substantially different from that of the ophthalmic lens, the polarization splitter is advantageously in the form of a splitting cube made up by two prisms, one of them carrying on one of its faces, a stack as described above. It is also possible to design the splitter in the form of a plate embedded in the ophthalmic lens.

EXAMPLE 1

A biplanar MR8 substrate 6.8 mm thick of diameter 65–70 mm is cleaned in an ultrasound bath and then subject to thermal treatment at 60° C. in a stove for 3 hours.

The substrate thus prepared is then introduced into deposition apparatus under vacuum. It is then subject to ionic cleansing under argon at a pressure of $3 \cdot 10^{-5}$ mbar at a voltage of 120 V at the anode and 1 A current for 2 minutes.

Next, a layer of $PrTiO_3$ is deposited with a thickness as given in Table 1, at a pressure of $2.5 \cdot 10^{-5}$ mbar under the following conditions:

Rate of evaporation: 3 nm/s;

Oxygen pressure: $5 \cdot 10^{-5}$ mbar;

Evaporation source: electron gun.

The thickness of the layer deposited is monitored using a quartz balance and evaporation is stopped when the thickness given in Table 1 is reached.

Next, a layer of $SiO_2$ is deposited with a thickness given in Table 1 under the same conditions.

One thus deposits, alternately, a total of 12 layers. Finally, the substrate thus treated is cut so as to obtain polarization splitters of the desired shape. The optical characteristics of a polarization splitter thus obtained are given in FIG. 2 for an angle of incidence of 45°. FIG. 1 shows the respective transmittance of the polarization splitter with respect to perpendicular and parallel polarization light. It will be seen that transmittance is on average about 95% for P-polarization light while S-polarization light is reflected by 90% on average.

TABLE 1

| Layer | Material | Thickness [nm] |
| --- | --- | --- |
| 1 | $SiO_2$ | 162.25 |
| 2 | $PrTiO_3$ | 104.44 |
| 3 | $SiO_2$ | 161.13 |
| 4 | $PrTiO_3$ | 87.49 |
| 5 | $SiO_2$ | 166.51 |
| 6 | $PrTiO_3$ | 87.22 |
| 7 | $SiO_2$ | 129.95 |
| 8 | $PrTiO_3$ | 69.43 |
| 9 | $SiO_2$ | 106.53 |
| 10 | $PrTiO_3$ | 54.35 |
| 11 | $SiO_2$ | 102.68 |
| 12 | $PrTiO_3$ | 65.77 |

EXAMPLE 2

The same procedure is followed as in Example 1, except that over the complete treatment cycle, the substrate is heated to a temperature of 80° C.

EXAMPLE 3

Comparative Example

The same procedure is followed as in example 1, but the $PrTiO_3$ is replaced by $ZrO_2$. The respective thicknesses of the layers are given in Table 2.

TABLE 2

| Layer | Material | Thickness [nm] |
| --- | --- | --- |
| 1 | $SiO_2$ | 154.74 |
| 2 | $ZrO_2$ | 108.36 |
| 3 | $SiO_2$ | 152.92 |
| 4 | $ZrO_2$ | 90.09 |
| 5 | $SiO_2$ | 166.17 |
| 6 | $ZrO_2$ | 85.98 |
| 7 | $SiO_2$ | 126.77 |
| 8 | $ZrO_2$ | 71.75 |
| 9 | $SiO_2$ | 106.81 |
| 10 | $ZrO_2$ | 55.87 |
| 11 | $SiO_2$ | 99.58 |
| 12 | $ZrO_2$ | 66.36 |

Thermal Withstand Ability

The polarization splitters produced as per examples 1–3 were tested as to their ability to withstand temperature.

For this, the polarization splitter was placed in a stove heated to 60° C. for 1 hour. Following this, the visual appearance of the substrates was evaluated. When the substrate showed no crazing, the set point temperature of the stove was increased by 10° C., and the test was restarted. The critical temperature is now defined as a temperature at which the substrates showed crazing.

The critical temperatures thus determined are given in Table 3.

TABLE 3

| Example | Critical temperature [° C.] |
|---|---|
| 1 | 110° C. |
| 2 | 130° C. |
| 3 | 90° C. |

It will be seen that for the polarization splitters obtained according to the invention, in other words Examples 1 and 2, the critical temperatures are higher, extending up to 110° C. or even 130° C. if the substrate is heated during the deposition cycle.

Apart from the applications described above, the polarization splitter is useful in all fields where it is desired to supply and process polarized light. Additionally, the polarization splitter of the invention can be used to separate light into its circular or elliptic polarization components.

What is claimed is:

1. Apparatus comprising:
    a polarization splitter comprising a substrate provided with an alternating stack of layers of PrTiO₃ and a material having a lower refractive index, the thickness of these layers e1 and e2 respectively satisfying the relations:

$$e_1 = \frac{\lambda \sqrt{n_1^2 + n_2^2}}{4n_1^2} \qquad e_2 = \frac{\lambda \sqrt{n_1^2 + n_2^2}}{4n_2^2}$$

in which λ is the wavelength considered, n1 is the refractive index of the first layer and n2 is the refractive index of the second layer respectively.

2. The apparatus according to claim 1, wherein the substrate is organic.

3. The apparatus according to claim 2, wherein the organic substrate is a polythiourethane.

4. The apparatus according to claim 1, wherein the second material is silicon dioxide.

5. The apparatus according to claim 1, carrying respectively at least six layers of praseodymium titanate and of second material.

6. The apparatus according to claim 1, in the form of a cube formed from two prisms one of which is coated with layers of PrTiO₃ and material of lower refractive index according to claim 1.

7. Apparatus comprising:
    a polarization splitter comprising an organic substrate provided with an alternating stack of at least six layers of PrTiO₃ and silicon dioxide, the thickness of these layers e1 and e2 respectively satisfying the relations:

$$e_1 = \frac{\lambda \sqrt{n_1^2 + n_2^2}}{4n_1^2} \qquad e_2 = \frac{\lambda \sqrt{n_1^2 + n_2^2}}{4n_2^2}$$

in which λ is the wavelength considered, n1 is the refractive index of the first layer and n2 is the refractive index of the second layer respectively.

8. A method for producing a polarization splitter comprising:
    (i) providing a substrate;
    (ii) depositing a layer of praseodymium titanate of a thickness $e_1$;
    (iii) depositing a layer of a second material of a thickness $e_2$; such that $$e_1 = \frac{\lambda \sqrt{n_1^2 + n_2^2}}{4n_1^2} \qquad e_2 = \frac{\lambda \sqrt{n_1^2 + n_2^2}}{4n_2^2}$$

in which λ is the wavelength considered, n1 is the refractive index of the first layer and n2 is the refractive index of the second layer, wherein n1 is greater than n2; and
    (iv) repeating steps (ii) and (iii) at least once.

9. The method according to claim 8, wherein step (iv) comprises at least five repetitions of steps (ii) and (iii).

10. The method according to claim 8, wherein the substrate is maintained at a temperature greater than ambient temperature during steps (ii) to (iv).

11. The method according to claim 10, wherein the substrate is maintained at a temperature comprised between 80 and 120° C. during steps (ii) to (iv).

12. The method according to one of claim 8, wherein the substrate is subject to ionic cleaning prior to step (ii).

13. The method according to claim 12, wherein the ionic cleaning is performed under argon.

14. The method according to claim 8, wherein the rate of evaporation during steps (ii) and (iii) is from 1 to 10 nm/s.

15. The method according to claim 14, wherein the rate of evaporation during steps (ii) and (iii) is from 2 to 5 nm/s.

16. The apparatus of claim 1, further comprising an ophthalmic lens having inserts for projecting an image towards a user, the inserts comprising the polarization beam splitter.

17. The apparatus of claim 7, further comprising an ophthalmic lens having inserts for projecting an image towards a user, the inserts comprising the polarization beam splitter.

18. The apparatus according to claim 16, wherein the polarization beam splitter is in the form of a cube.

19. The apparatus according to claim 17, wherein the polarization beam splitter is in the form of a cube.

20. The apparatus of claim 16, further comprising a device for projecting an image towards a user, the projecting device comprising the ophthalmic lens.

21. The apparatus of claim 17, further comprising a device for projecting an image towards a user, the projecting device comprising the ophthalmic lens.

22. The apparatus of claim 20, the projection device further comprising a liquid crystal micro-display.

23. The apparatus of claim 21, the projection device further comprising a liquid crystal micro-display.

* * * * *

UNITED STATES PATENT AND TRADEMARK OFFICE
CERTIFICATE OF CORRECTION

PATENT NO.     : 6,891,673 B2
DATED          : May 10, 2005
INVENTOR(S)    : Herve Cado, Frederic Arrouy and Yvon Helmstetter It is certified that error appears in the above-identified patent and that said Letters Patent is hereby corrected as shown below:

Title page,
Item [75], Inventors, please replace "Frederic Arrouy, Verlaines (FR)" with
-- Frederic Arrouy, Verdun (FR) --.

Signed and Sealed this

Thirteenth Day of December, 2005

JON W. DUDAS
*Director of the United States Patent and Trademark Office*